(12) United States Patent
Burchard et al.

(10) Patent No.: US 7,346,726 B2
(45) Date of Patent: Mar. 18, 2008

(54) INTEGRATED CIRCUIT WITH DYNAMIC COMMUNICATION SERVICE SELECTION

(75) Inventors: Artur Tadeusz Burchard, Eindhoven (NL); Françoise Jeannette Harmsze, Eindhoven (NL); Harm Jan Hiltjo Nanno Kenter, Eindhoven (NL)

(73) Assignee: NXP B.V., Eindhoven (NL)

( * ) Notice: Subject to any disclaimer, the term of this patent is extended or adjusted under 35 U.S.C. 154(b) by 118 days.

(21) Appl. No.: 10/566,552

(22) PCT Filed: Jul. 21, 2004

(86) PCT No.: PCT/IB2004/051269

§ 371 (c)(1),
(2), (4) Date: Jan. 27, 2006

(87) PCT Pub. No.: WO2005/010768

PCT Pub. Date: Feb. 3, 2005

(65) Prior Publication Data

US 2006/0190650 A1    Aug. 24, 2006

(30) Foreign Application Priority Data

Jul. 30, 2003    (EP) .................................. 03102355

(51) Int. Cl.
*G06F 13/00*    (2006.01)

(52) U.S. Cl. .......................... 710/310; 710/52; 710/56

(58) Field of Classification Search .................. 710/52, 710/56, 310
See application file for complete search history.

(56) References Cited

U.S. PATENT DOCUMENTS

| | | | |
|---|---|---|---|
| 5,734,843 A | 3/1998 | Gephardt et al. | |
| 5,935,232 A | 8/1999 | Lambrecht et al. | |
| 2006/0095920 A1* | 5/2006 | Goossens | 719/313 |
| 2006/0123154 A1* | 6/2006 | George | 710/33 |
| 2006/0274786 A1* | 12/2006 | Malalur et al. | 370/468 |

* cited by examiner

*Primary Examiner*—Glenn A. Auve
(74) *Attorney, Agent, or Firm*—Peter Zawilski

(57) ABSTRACT

An integrated circuit comprising a plurality of modules (M1 to M5, CPU) for processing applications, a global memory (GM), which can be shared by said plurality of modules (M1 to M5, CPU), an interconnect means (IM) for interconnecting said modules (M1 to M5, CPU) and said global memory (GM) based on a plurality of communication services (C1, C2) is provided. Said integrated circuit further comprises at least one communication managing unit (CMU) for managing the communication between said plurality of modules (M1 to M5), wherein said communication managing unit (CMU) receives a request for a communication between at least two of said modules (M1 to M5, CPU) and dynamically selects one of said plurality of communication services (C1, C2) as basis for the requested communication between said modules (MI to M5, CPU).

8 Claims, 2 Drawing Sheets

INTEGRATED CIRCUIT WITH DYNAMIC COMMUNICATION SERVICE SELECTION

FIELD OF THE INVENTION

The invention relates to an integrated circuit comprising a plurality of modules and a method for dynamic communication service selection in such an integrated circuit.

BACKGROUND OF THE INVENTION

With the recent development of computation and communication resources two main trends in the architecture of mobile terminals have risen. The first trend is the application convergence and increasing diversity, e.g. more and more diverse functions or subsystems are integrated into a single terminal enabling the terminal to perform new services and applications. The second trend is directed to the aggravation of architecture complexity, e.g. the overall complexity of both hardware and software architectures exceeds the limits of conventional architectures style based on cores connected by buses.

One possible solution to meet for the above mentioned trends appears to be modularity. When the boundaries of modules are chosen to coincide with functional subsystems like GSM modems, displays or audio, two levels of hardware and software architecting can be derived. The first one is the intra-subsystem architecture where the conventional architecture style based on cores connected by buses can be applied whereby existing subsystems can be re-used. The second level of architecting is the inter-subsystem architecture, where a network architecture is applied, with the inter-subsystem communication being performed on an OSI-like layered network architecture. With these two levels of architecting the development of functional subsystems can be performed as already known in the art, and therefore intellectual property (IP)-Blocks can be re-used.

Typically, most mobile terminals provide their function on the bases of a few peripheral components, like a portable audio player (an audio subsystem and a CD or solid-state storage), a mobile phone (GSM modem and speech codec), a palm-top organizer (touch screen+microprocessor) or a solid-state camera (camera+display+solid-state storage). The variety of these different subsystems, e.g. peripheral components, increases steadily. These different subsystems evolve independently of each other and rapidly become more advanced and more complex, so that their performance parameters, like bit rates, capacity, resolution and quality steadily improve. The actual terminals contain more and more subsystems and the internals of the subsystems become less important since the emphasis is moved towards software, applications and services.

While the traditional architecting based on cores and buses have been focussing on computations over a limited set of computation resources, scheduling tasks over a small set of tightly coupled blocks having low latencies, and tight bus protocols, the architecting between subsystems focuses no longer on computation but on communication. The resources shared by the different subsystems is the communication infrastructure and possibly a shared memory. These subsystems are usually loosely coupled with relatively high latencies and relatively low synchronisation rates as well as network protocols.

A terminal usually consists of a plurality of subsystems which are connected to each other via a network. Subsystems like UMTS modems or video codec can be designed independently. They may contain one or more programmable cores, some coprocessors, local memories and I/O. The network is used to connect the subsystems. All inter-subsystem communication, like data, instructions, memory traffic and control information will be performed via the network.

A so called Systems-on-Chip SoC typical comprise a plurality of subsystems e.g. functional elements or modules with local memory, which are connected by an interconnect scheme. This System-on-Chip SoC are adapted to perform different applications which can be mapped onto the set of subsystems. All functions performed by the subsystems require a certain amount of memory for the performance of their processings. The exact amount of memory will depend on a plurality of parameters like the screen size for video decoding, the data rate for modems or the like. Accordingly, different applications will have different demands for memory. Nowadays most application domains in the area of consumer electronics require that the system cost as well as the power consumption is minimized. To be competitive in the above mentioned constraint environment it is essential that the required amount of memory (both on-chip or external) is optimised for the specific application. On the other hand, with the above described trend of convergence of many consumer electronics markets like mobile phones, PDAs, MP3 player or the like, it is not feasible any more to look at a single specific application or merely a limited set of applications. Any realization of the terminal must be low-cost and low-power, where the costs are substantially defined by the bill of material, namely the chip area, the chip count, pin counts and PCB wiring layers.

Additionally to the above memory requirements, several different communication services are required to cope with the on chip communication, where the different blocks or modules in the system may produce processing data with different speeds and at different granularities. One communication service may be based on a direct connection with only a small buffer located in a local memory of a module, where two hardware blocks or modules communicate directly between each other via a network characterized by a low granularity of data exchange, and a high synchronization rate. A second communication service may be based on a memory-based connection, where data is stored in a buffer in order to decouple two communicating blocks or modules. Memory-based communication is characterized by a coarse granularity of data exchange, and a lower synchronization rate because of a larger buffer can be allocated in a shared memory.

Known systems are usually designed such that all possible connections between modules are already evaluated during the design of the system and each communication is statically linked to a certain communication service. Typically, resource constrained systems are very much optimized towards the usage of the resources, the communication is known well and is static and furthermore there is no dynamic connection creation. This might be feasible for systems with already known applications, however, for systems where the final applications are not yet known or may be altered during their lifetime, the communication between the blocks or modules must be more flexible. Accordingly, the system must be able to provide a dynamic allocation of communication resources. Although sometimes connections in such systems are created dynamically only one predefined connection service is used. Especially for resource constrained systems on chip SoC, i.e. being low on resources, a dynamic allocation of communication resources is essential in order to provide low costs and low power devices. When a certain communication request is served always in the same way (possibly the worst case) regardless of its present parameters, some cases may appear where all resources are already occupied. Accordingly, other communication requests might be denied since all the resources are occupied. Especially for portable devices, which are heavily power constrained and where the functionality of several devices converges and effective usages of the available resources is essential to be competitive in this particular area. Therefore, a more flexible handling of the communication requests and the granting of corresponding communication resources appears to be beneficial.

SUMMARY OF THE INVENTION

It is therefore an object of the invention to provide a dynamic selection of communication services in a System on Chip with a plurality of modules.

Therefore, an integrated circuit comprising a plurality of modules M1 to M5, CPU for processing applications, a global memory GM, which can be shared by said plurality of modules M1 to M5, CPU, an interconnect means IM for interconnecting said modules M1 to M5, CPU and said global memory GM based on a plurality of communication services C1, C2 is provided. Said integrated circuit further comprises at least one communication managing unit CMU for managing the communication between said plurality of modules M1 to M5, wherein said communication managing unit CMU receives a request for a communication between at least two of said modules M1 to M5, CPU and dynamically selects one of said plurality of communication services C1, C2 as basis for the requested communication between said modules M1 to M5, CPU.

Therefore, the system can react dynamically to changes in the communication between the modules.

According to an aspect of the invention, the communication services C1, C2, which requires the least interconnect resources, is selected. Accordingly, a better resource usage is allowed and thus more communication channels may be opened in a resource constrained environment According to a further aspect of the invention, a first communication service C1 is selected allowing a memory-based communication between at least two of said modules (M1 to M5, CPU, if the granularity and data rates of the two modules M1 to M5, CPU do not matches or if one of said two modules M1 to M5, CPU does not comprise sufficient local buffering, and a second communication service is selected allowing a direct communication if the granularity and data rates of the two modules M1 to M5, CPU match and if one of said two modules M1 to M5, CPU comprises sufficient local buffering. Therefore, the direct communication service will be selected if possible, whereby reducing required bandwidth, memory allocation and additionally the power usage of the system.

According to still a further aspect of the invention, the selection is performed every time a request for establishing a communication between at least two of said plurality of modules M1 to M5, CPU is received by the communication managing unit CMU. Therefore, allowing the system to dynamically allocate the optimal resources for every requested communication and thereby enabling an optimal resource usage.

According to still a further aspect of the invention, the resources, which were reserved for the communication between said two of said plurality of modules, are released after having performed the requested communication. Accordingly, the reserved resources are immediately released so that they can be re-used again for other requested communications.

The invention also relates to a method for selecting communication services in an integrated circuit as described above. The communication between said plurality of modules M1 to M5 is managed by receiving a request for a communication between at least two of said modules M1 to M5, CPU and by dynamically selecting one of said plurality of communication services C1, C2 as basis for the communication between said modules M1 to M5, CPU.

The invention will now be described in detail with reference to the figure.

PREFERRED EMBODIMENT OF THE INVENTION

The System on Chip according to the invention may be low on resources, i.e. a system for low cost and low power like a mobile phone or a portable device. However, the principles of the invention may also be applied to less constrained environments.

Figure 1:
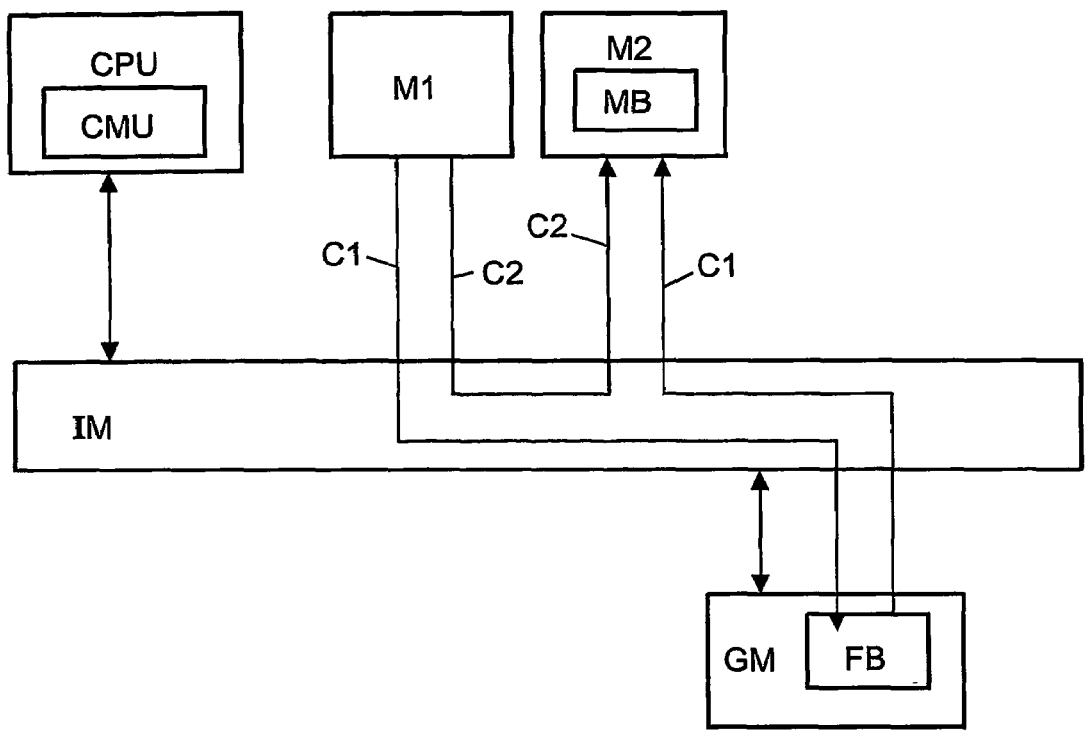
FIG. 1 shows a block diagram of a system on-chip according to a first embodiment.

FIG. 1 shows a block diagram of a System on Chip SoC according to a first embodiment of the invention. The system comprises two modules M1, M2, a central processing unit CPU, a global memory GM and an interconnect means IM. The second module M2 comprises a memory buffer MB. The global memory GM comprises a global buffer FB and is used as a shared memory, where the CPU or the two modules M1, M2 can store data. A communication managing unit CMU is implemented on the central processing unit CPU on a software basis and is used to manage the communication between the CPU and the modules as well as the inter-module communication.

The different modules can produce data with different speed and at different granularity, depending on the applications running on the modules. The inter-module communication can be implemented by two ways, namely a direct block-to-block or module-to-module communication or a memory-based communication. The direct block-to-block communication is predominately used for the exchange of small tokens. This communication has a rather high synchronization rate but merely small buffers are used, which are local to one of the blocks. The memory-based communication is mainly used for large tokens with a much lower synchronization rate but larger buffers located in the main memory, i.e. the shared memory GM. Only using a direct block-to-block communication will lead to a system that it is not flexible since some particular connections can only be established using memory-based services. However, if only memory-based communications are performed, this will result in an over-use of the shared memory and the required power for cases with a lower communication demand, whereby also the handling of other communication requests are prevented or blocked.

By implementing the communication managing unit CMU the System on Chip can dynamically allocate either the direct block-to-block or the memory-based communication depending on the actual granularity and the data rate of the requested communication. Accordingly, the decision which communication scheme or communication service is to be implemented, is based on the analysis of the actual parameters of the requested communication. According to the first embodiment the management of the communication between the first and the second module M1, M2 is performed by the communication managing unit CMU implemented on the CPU. The communication between the two modules M1, M2 can be performed via the connection C1 or via the connection C2. The connection C1 is implemented as a memory-based communication, i.e. the module M1 writes data into the global buffer FB and the module M2 reads these data from the global buffer FB. The connection C2 is implemented as direct communication from module M1 to module M2, where the data can be written directly into the memory buffer MB. According to the first embodiment the decision, which connection (C1 or C2) to use is performed by the communication managing unit CMU implemented as a software task running on the CPU. Accordingly, the decision process is performed in a central place in the system.

During the processing of an application on the system, a request can be issued from the CPU to the communication managing unit CMU to establish a communication or connection between module M1 and module M2. Alternatively, this request can also be send from one of the modules M1, M2. The communication managing unit CMU retrieves the parameters of the requested communication from the application or the sending module. These parameters may be the granularity or bandwidth of the required communication.

If the parameters of the communication correspond to each other and one of the modules, i.e. the receiving module, has sufficient local buffering, i.e. a module buffer MB, the direct module-to-module communication is used to establish the connection C2. However, if the parameters do not match then the memory-based connection C1 is chosen. The decision, which one of the above-mentioned communication scheme is to be used, is preferably performed every time a request for establishing a connection is received by the communication managing unit CMU. Accordingly, the system is able to dynamically allocate the optimal resources to a communication request. After the communication between the modules or between the CPU and one of the modules is successfully performed, the resources which have been reserved for this communication like the global buffer FB in the global memory GM is released, so that these resources can be used for other connections. Therefore, the system memory and the bandwidth of the system can be optimally used, so that the resources allocation of the overall usage of the memory decreases as well the required bandwidth of the communication scheme allowing more communication channels to be opened at the same time as compared to the static situation. Additionally, since less resources are occupied the power dissipation of the system is reduced.

The direct communication between two modules has a smaller delay or latency as compared to the memory-based service, whereby the systems performance can be increased. However, the decision process taking place before the communication can be established, introduces an initial delay to the communication and also requires an control overhead by implementing the communication managing unit. On the other side, the connections do not need to be established in real time and furthermore the establishing of these connections is performed infrequently, so that certain delays may be acceptable.

Figure 2:
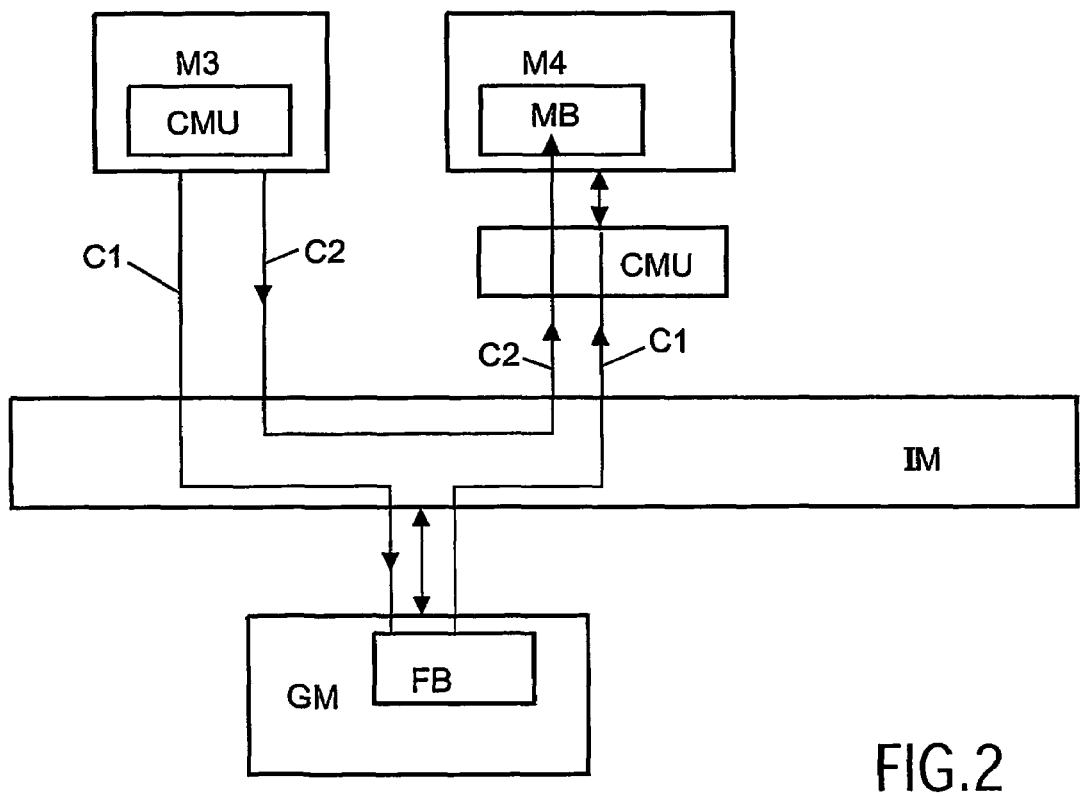
FIG. 2 shows a block diagram of a system on-chip according to a second embodiment.

FIG. 2 shows a block diagram of a System on Chip according to a second embodiment of the invention. The System on Chip comprises two modules M3, M4, and interconnect means IM and a global memory GM. The global memory GM comprises a global buffer FB. The module M3 comprises a communication managing unit CMU, which is implemented as a software task on said module M3. The module M4 comprises a module buffer MB and a communication managing unit CMU—implemented as a hardware block—is associated to the module M4. The communication managing unit CMU or the two modules M3, M4 are used to manage the communication of the modules. The communication between the two modules M3, M4 can be performed via connection C1, i.e. a memory-based communication, or via connection C2, i.e. a direct communication.

According to the second embodiment there is no central communication managing unit as in the first embodiment. The management of the communication of the modules is a distributed and is executed on/or for each of the modules. The communication management can either be performed on the module, which is initialing the communication or on the module, which is receiving the communication, i.e. the slave. Alternatively, the communication management may be performed on the initiating as well as on the receiving module. In such a situation the decision mechanism has to be implemented for every module. The communication managing may be implement as a software task (module M3) or as a hardware element, which is arranged as a shell between the module and the interconnect means IM.

The actual decision mechanism is performed as described in the first embodiment. First of all, a request is received to establish a communication between the two modules. This request may be send from one of the blocks or from the application which is parently performed on the System on Chip. The communication managing unit CMU, which is preferably associated to the initiating module (alternatively this may also be the receiving module) has to check the parameters required for this communication. As mentioned above, this may be the granularity or the bandwidth. If the communication parameter of the sending and receiving module matches and if the receiving module has sufficient local buffering in its module buffer MB, than a direct module-to-module communication is chosen and a corresponding connection, i.e. connection C2, is established between the modules. However, if the communication parameters of the modules do not match or if there is not sufficient local buffering in the module buffer MB, then a memory based communication is chosen and a connection C1 is used.

According to an alternative embodiment a System on Chip SoC based on a combination of the first and second embodiment may be provided. Accordingly, the selection of communication services may be performed central or decentral.

Figure 3:
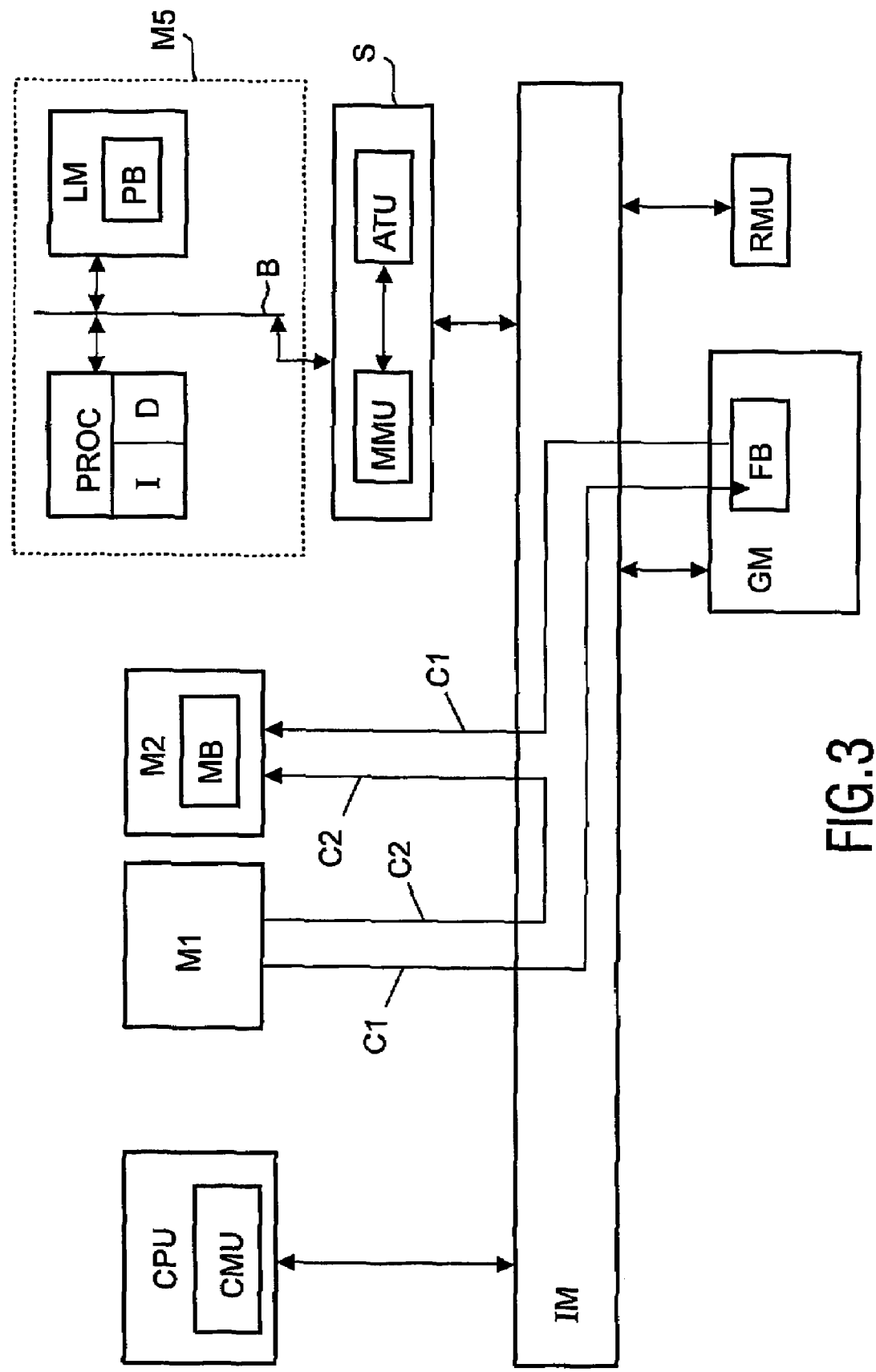
FIG. 3 shows a block diagram of a system on-chip according to a third embodiment.

FIG. 3 shows a system on chip according to the third embodiment of the invention. The third embodiment is based on the first embodiment. The system comprises a module M5, a shell S, an interconnect means IM, a global memory GM and a resource managing unit RMU. The module M5 is connected to the global memory GM via the shell S and the interconnect means IM. The module M5 comprises a processor PROC, an instruction cache I, a data cache D, and a local memory LM. The processor PROC and the local memory LM are connected to each other via a bus B. The local memory LM comprises a prefetch buffer PB. The local memory LM is used as a private memory exclusively for the module M. The local memory LM is dimensioned as a small memory which is enough to run applications with low memory demands. The amount of this memory space may depend on the application performed on the module M5.

Additionally, as shown in FIG. 1, the system further comprises a central processing unit CPU, and two modules M1, M2. The second module M2 comprises a memory buffer MB. The global memory GM comprises a global buffer FB and is used as a shared memory, where the CPU or the two modules M1, M2 can store data. A communication managing unit CMU is implemented on the central processing unit CPU on a software basis and is used to manage the communication between the CPU and the modules as well as the inter-module communication. The selection of the communication services is performed according to the first embodiment.

The module M5 may be any subsystem and may further comprise other functional blocks, performing dedicated applications or several different applications. The shell S is provided between the module M5 and the interconnect scheme IM and is used to manage the communication between the module and the interconnect scheme. The idea of the shell S is to hide the properties of the interconnect scheme to the module. Accordingly, already existing modules can be used without having to re-design their communication, since the shell S is used as an interface. The interconnect scheme IM is preferably a network on a chip but may also be a bus-based scheme.

The shell S comprises a memory managing unit MMU and an addressed translation unit ATU. The memory managing unit MMU monitors the free memory space in the local memory LM and requests the allocation of a global buffer FB in the global memory GM as soon as the available memory space in the local memory LM is lower than a predetermined minimum value. The idea behind this is to outsource processing data from the application being run on the module M, for which there is not enough space in the local memory LM. The address translation unit ATU is then provided to translate the address used by the application run on the module M into addresses of the global address map corresponding to the global memory GM.

As mentioned above the memory managing unit MMU sends a request for a buffer in the global memory GM which should be reserved exclusively for the processing data from this module. This requests from the memory managing unit MMU is send to the resource managing unit RMU. The resource managing unit RMU is provided to manage the overall resources in the system. Additionally, the memory managing unit MMU requests for the provision of a guaranteed data path between the module M and the global memory GM via the interconnect scheme IM. The resource managing unit RMU receives these requests and determines whether there is enough space available in the global memory GM to reserve a buffer of the requested size as well as whether the interconnect scheme IM can provide enough bandwidth for the requested communication path between the module M5 and the global memory GM. If the resource managing unit RMU has determined, that there is enough space available in the global memory GM and that there is enough communication resources available for the communication path, the resource managing unit RMU sends a response to the memory managing unit MMU. The resource managing unit RMU includes the available space of the global buffer FB in the global memory GM as well as the address thereof into the response. As soon as the memory managing unit MMU has received this positive response from the resource managing unit RMU, it can activate the address translation unit ATU. The address translation unit ATU is used to hide the outsourcing of the processing data from the application run on the module M. In order to do this hiding, the addresses of the processing data which can not be stored any more in the local memory LM are provided with an offset. The offset of the address of those processing data, which can not be stored in the local memory LM, is calculated based on the address of the global buffer FB in the global memory GM as returned by the resource managing unit RMU.

To achieve an additional improvement of the performance of this system, data stored in the global buffer FB can be prefetched before they are being used by the application run on the module M and stored in the prefetch buffer PB in the local memory LM. By prefetching this data the longer path of the global buffer FB in the global memory GM is hidden from the application and the latency introduced by outsourcing the processing data can also be hidden from the application.

The allocation of the global buffer FB in the global memory GM can be performed at run-time of a certain application or may as well be performed after a predetermined period of time or alternatively, it may be performed based on certain events as described above.

If on-chip as well as off-chip global memory is present in the system, the allocation of a buffer in the global memory will be done such as to optimized the cost, the power and the bandwidth resources.

The drawbacks of the dynamic memory allocation according to the invention is that additional complexity is added to the interface or shell of the modules M by introducing an address translation unit ATU. Furthermore, the resource managing unit RMU needs to be incorporated into the system on-chip, in order to keep track of the available communication resources. The exporting or outsourcing of a data will introduce additional latency. Moreover, the resource managing unit RMU needs to perform an access arbitration at the global memory, so that the required communication paths can be guaranteed.

According to a further embodiment of the invention the dynamic memory allocation of the third embodiment may also be applied in a System on Chip SoC according to the second embodiment or alternatively in a System on Chip SoC based on a combination of the first and second embodiment.

The communication managing unit CMU according to the embodiments of the invention may also be implemented in the shell S according to the third embodiment together with the memory managing unit MMU and the address translation unit ATU.

The parameters of the communication between modules, the parameters of the modules or parameters of the applications running on the modules may be stored and managed by the resource managing unit RMU. Therefore, the inquiring of the CMU for the communication parameters can alternatively be performed by issuing a request for these parameters to the RMU.

The communications between modules may also be performed between more than two modules, e.g. by a multicast, i.e. one sending module and several receiving modules.

The communication management unit CMU as described in the above embodiments can also communicate with modules (M1 to M5). These modules for example may send requests and the CMU sends grants or programs buffer sizes. This may happen also during the actual data exchange, since the modules have to communicate between themselves to synchronize, for example to notify the other module that the buffer has been filled and can be emptied by the other module. This communication is performed in the opposite direction to data communication and may be implemented as a control communication. Basically, such control traffic, as sending requests, programming modules (M1 to M5) or synchronizing between them is done directly without going into global memory. For this traffic sometimes also a separate communication media (a bus) may be used.

Additionally, the interconnect IM may be realized as a network, where the path through this network based on for example latency can be dynamically assigned. Such interconnect means IM can also for example offer communication channels with different parameters like bandwidth, delay, decoupling (by means of buffer in global memory). The appropriate channel (channel with appropriate parameters) for a certain type of communication with certain parameters) may be dynamically chosen.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. Integrated circuit comprising:
   a plurality of modules for processing applications;
   a global memory adapted to be shared by said plurality of modules;
   an interconnect means for interconnecting said modules and said global memory to allow communications between said modules based on a plurality of communication services; and
   at least one communication managing unit for managing communication between said plurality of modules, wherein said communication managing unit receives a request for a communication between at least two of said modules and dynamically selects one of said plurality of communication services as basis for the requested communication between the at least two of said modules, and wherein one of the plurality of communication services facilitates a memory-based communication between the at least two of said modules via the global memory and another one of the plurality of communication services allows direct communication between the at least two of said modules.

2. Integrated circuit according to claim 1, wherein the selected one of the plurality of communication services requires fewer interconnect resources than a non-selected one of the plurality of communication services.

3. Integrated circuit according to claim 1, wherein the communication service that allows a memory-based communication between the at least two of said modules is selected when granularities and data rates of the two modules do not match or when one of said two modules does not have sufficient local buffering.

4. Integrated circuit according to claim 3, wherein the selection is performed every time a request for establishing a communication between at least two of said plurality of modules is received by the communication managing unit.

5. Integrated circuit according to claim 1, wherein the communication service that allows direct communication between the at least two of said modules is selected when granularities and data rates of the two modules match and when one of said two modules has sufficient local buffering.

6. Integrated circuit according to claim 1, wherein resources, which were reserved for the communication between said two of said plurality of modules, are released after having performed the requested communication.

7. Integrated circuit according to claim 1, wherein said applications are resource constrained.

8. Method for selecting between a plurality of communication services in an integrated circuit, the integrated circuit having a plurality of modules for processing applications, and a global memory being adapted to be shared between said plurality of modules, the method comprising the steps of:
   managing communications between said plurality of modules, by receiving a request for a communication between at least two of said modules and
   by dynamically selecting one of said plurality of communication services as basis for the communication between the at least two of said modules, wherein one of the plurality of communication services facilitates a memory-based communication between the at least two of said modules via the global memory and another one of the plurality of communication services facilitates direct communication between the at least two of said modules.

* * * * *